(12) United States Patent
He

(10) Patent No.: US 8,976,306 B2
(45) Date of Patent: Mar. 10, 2015

(54) SHUTTER GLASSES AND RELATED 3D DISPLAY SYSTEM

(71) Applicant: Shenzhen China Star Optoelectronics Technology Co., Ltd., Shenzhen, Guangdong (CN)

(72) Inventor: Jhen-Wei He, Shenzhen (CN)

(73) Assignee: Shenzhen China Star Optoelectronics Technology co., Ltd., Shenzhen, Guangdong (CN)

( * ) Notice: Subject to any disclaimer, the term of this patent is extended or adjusted under 35 U.S.C. 154(b) by 184 days.

(21) Appl. No.: 13/812,147

(22) PCT Filed: Jan. 11, 2013

(86) PCT No.: PCT/CN2013/070344
§ 371 (c)(1),
(2) Date: Jan. 25, 2013

(87) PCT Pub. No.: WO2014/107875
PCT Pub. Date: Jul. 17, 2014

(65) Prior Publication Data
US 2014/0192280 A1 Jul. 10, 2014

(51) Int. Cl.
*G02F 1/1335* (2006.01)
*H04N 13/04* (2006.01)

(52) U.S. Cl.
CPC .................. *H04N 13/0434* (2013.01)
USPC ......................................................... 349/13

(58) Field of Classification Search
USPC ......................................................... 349/13
See application file for complete search history.

(56) References Cited

U.S. PATENT DOCUMENTS

| 4,795,248 | A | * | 1/1989 | Okada et al. | 351/158 |
| 5,196,953 | A | * | 3/1993 | Yeh et al. | 349/119 |
| 5,264,952 | A | * | 11/1993 | Fukutani et al. | 349/78 |
| 5,296,952 | A | * | 3/1994 | Takatsu et al. | 349/77 |
| 2011/0115993 | A1 | * | 5/2011 | Liu et al. | 349/13 |
| 2011/0221981 | A1 | * | 9/2011 | Tanaka | 349/13 |
| 2011/0317082 | A1 | * | 12/2011 | Saitoh et al. | 349/13 |
| 2014/0009701 | A1 | * | 1/2014 | Tanaka | 349/13 |

* cited by examiner

*Primary Examiner* — Timothy L Rude
(74) *Attorney, Agent, or Firm* — Andrew C. Cheng

(57) ABSTRACT

The present invention discloses shutter glasses and a 3D display system. The shutter glasses include a first polarizer, a second polarizer, a normally-white LCD panel, and a normally-black LCD panel. A thickness of the normally-white LCD panel is not the same as a thickness of the normally-black LCD panel, and an optical compensation film is installed between the first polarizer and the liquid crystal layer of the normally-black LCD panel and/or between the second polarizer and the liquid crystal layer of the normally-black LCD panel in order to compensate for a dispersion occurred when the liquid crystal layer of the normally-black LCD panel is in a dark mode. In this way, the present invention can not only shorten the response time of the shutter glasses to reduce the power consumption, but also reduce the 3D crosstalk.

20 Claims, 5 Drawing Sheets

SHUTTER GLASSES AND RELATED 3D DISPLAY SYSTEM

BACKGROUND OF THE INVENTION

1. Field of the Invention

The invention relates to display techniques, and more particularly, to a shutter glasses and a 3D display system.

2. Description of the Prior Art

In the age of high-definition TV, a 3D mode has become a preferred function of a big-size TV. In general, specific glasses are required when a user watches the 3D image on the 3D TV. The 3D TVs can be categorized into two categories, shutter-type 3D TV and polarization-type 3D TV.

The shutter-type 3D TV requires a shutter glasses having an LCD having a 120 Hz or higher refresh rate to show the 3D images. The basic theory of the shutter glasses is: When a left-eye image is being shown, the right-eye of the shutter glasses is closed, and when a right-eye image is being shown, the left-eye of the shutter glasses is closed. In this way, the left-eye images and the right-eye images can be separately viewed by single eye such that the user can feel the 3D effect.

Currently, the shutter glasses often utilize a twisted nematic type (TN type) LCD panel. Please refer to FIG. 1, which is a diagram showing a response waveform of shutter glasses according to the related art. As shown in FIG. 1, the luminance of the shutter glasses changes according to the variance of the input voltage of the LCD panel. Furthermore, the rising time (Tr) and the falling time (Tf) are not the same. From FIG. 1, it can be seen that the rising time (Tr) is shorter than the falling time (Tf), and the falling time (Tf) is double to triple of the rising time (Tr). Therefore, this often introduces a 3D motion blur and a luminance insufficiency of the 3D image. In order to avoid aforementioned problems, two solutions are often used. The first solution is to time-interleavingly turn on the backlight for preventing the liquid crystals from being responded incompletely. The second solution is to raise the luminance of the LCD panel for compensating for the luminance insufficiency of the 3D images.

Unfortunately, these two solutions consume more power and raise the manufacturing cost of the LCD panel.

SUMMARY OF THE INVENTION

It is therefore one of the primary objectives of the present invention to provide a shutter glasses and a 3D display system, to reduce power consumption and 3D crosstalk.

According to an exemplary embodiment of the present invention, a shutter glasses comprises a frame, a liquid crystal display panel installed inside the frame, a first polarizer, and a second polarizer. The liquid crystal display panel comprises a normally-white LCD panel and a normally-black LCD panel. A thickness of the normally-white LCD panel is not the same as a thickness of the normally-black LCD panel. The first polarizer is installed between the normally-white LCD panel and the normally-black LCD panel. The normally-black LCD panel comprises a first substrate and a second substrate. A liquid crystal layer of the normally-black LCD panel is sandwiched between the first substrate and the second substrate. The first substrate is close to the first polarizer, and the second substrate is close to the second polarizer. The optical compensation film is installed between the first substrate and the first polarizer and/or between the second substrate and the second polarizer in order to compensate for a dispersion occurred when the liquid crystal layer of the normally-black LCD panel is in a dark mode. A thickness of the optical compensation film is determined according to a variance trend of the dispersion of the liquid crystal layer of the normally-black LCD panel, and the thickness is determined to be thicker when the variance trend is larger.

In one aspect of the present invention, the optical compensation film is made by a material selected from a group consisting of acetate fiber (TAC), cycloalkene polymer (COC), cycloalkene copolymer (COP), and thermoplastic polyester (PET).

According to an exemplary embodiment of the present invention, a shutter glasses comprises a frame, a liquid crystal display panel installed inside the frame, a first polarizer, and a second polarizer. The liquid crystal display panel comprises a normally-white LCD panel and a normally-black LCD panel. A thickness of the normally-white LCD panel is not the same as a thickness of the normally-black LCD panel. The first polarizer is installed between the normally-white LCD panel and the normally-black LCD panel. A liquid crystal layer of the normally-black LCD panel is installed between the first polarizer and the second polarizer. An optical compensation film is installed between the first polarizer and the liquid crystal layer of the normally-black LCD panel and/or between the second polarizer and the liquid crystal layer of the normally-black LCD panel in order to compensate for a dispersion occurred when the liquid crystal layer of the normally-black LCD panel is in a dark mode.

In one aspect of the present invention, a thickness of the optical compensation film is determined according to a variance trend of the dispersion of the liquid crystal layer of the normally-black LCD panel, and the thickness is determined to be thicker when the variance trend is larger.

In another aspect of the present invention, the normally-black LCD panel comprises a first substrate and a second substrate. The liquid crystal layer is sandwiched between the first substrate and the second substrate. The first substrate is close to the first polarizer, the second substrate is close to the second polarizer. The optical compensation film is installed between the first substrate and the first polarizer and/or between the second substrate and the second polarizer.

In another aspect of the present invention, the normally-black LCD panel comprises a first substrate and a second substrate. The liquid crystal layer is sandwiched between the first substrate and the second substrate. The first substrate is close to the first polarizer, and the second substrate is close to the second polarizer. The optical compensation film is installed between the first substrate and the liquid crystal layer and/or between the second substrate and the liquid crystal layer.

In another aspect of the present invention, the shutter glasses further comprises a third polarizer. The normally-white LCD panel is between the first polarizer and the third polarizer. An optical axis of the second polarizer is parallel to an optical axis of the first polarizer, and an optical axis of the third polarizer is perpendicular to the optical axis of the first polarizer.

In another aspect of the present invention, the optical compensation film is made by a material selected from a group consisting of acetate fiber (TAC), cycloalkene polymer (COC), cycloalkene copolymer (COP), and thermoplastic polyester (PET).

In another aspect of the present invention, the shutter glasses further comprises an incident side and an emitting side. The normally-black LCD panel is located on the incident side and the normally-white LCD panel is located on the emitting side.

In still another aspect of the present invention, the shutter glasses further comprises an incident side and an emitting side. The normally-black LCD panel is located on the emitting side and the normally-white LCD panel is located on the incident side.

In yet another aspect of the present invention, the shutter glasses further comprises a driving circuit, configured to generate a driving signal to drive the LCD panel.

According to an exemplary embodiment of the present invention, a 3D display system comprises a shutter glasses. The shutter glasses comprise a frame, a liquid crystal display panel installed inside the frame, a first polarizer, and a second polarizer. The liquid crystal display panel comprises a normally-white LCD panel and a normally-black LCD panel. A thickness of the normally-white LCD panel is not the same as a thickness of the normally-black LCD panel. The first polarizer is installed between the normally-white LCD panel and the normally-black LCD panel. A liquid crystal layer of the normally-black LCD panel is installed between the first polarizer and the second polarizer. An optical compensation film is installed between the first polarizer and the liquid crystal layer of the normally-black LCD panel and/or between the second polarizer and the liquid crystal layer of the normally-black LCD panel in order to compensate for a dispersion occurred when the liquid crystal layer of the normally-black LCD panel is in a dark mode.

In one aspect of the present invention, a thickness of the optical compensation film is determined according to a variance trend of the dispersion of the liquid crystal layer of the normally-black LCD panel, and the thickness is determined to be thicker when the variance trend is larger.

In another aspect of the present invention, the normally-black LCD panel comprises a first substrate and a second substrate. The liquid crystal layer is sandwiched between the first substrate and the second substrate. The first substrate is close to the first polarizer, the second substrate is close to the second polarizer. The optical compensation film is installed between the first substrate and the first polarizer and/or between the second substrate and the second polarizer.

In another aspect of the present invention, the normally-black LCD panel comprises a first substrate and a second substrate. The liquid crystal layer is sandwiched between the first substrate and the second substrate. The first substrate is close to the first polarizer, and the second substrate is close to the second polarizer. The optical compensation film is installed between the first substrate and the liquid crystal layer and/or between the second substrate and the liquid crystal layer.

In another aspect of the present invention, the shutter glasses further comprises a third polarizer. The normally-white LCD panel is between the first polarizer and the third polarizer. An optical axis of the second polarizer is parallel to an optical axis of the first polarizer, and an optical axis of the third polarizer is perpendicular to the optical axis of the first polarizer.

In another aspect of the present invention, the optical compensation film is made by a material selected from a group consisting of acetate fiber (TAC), cycloalkene polymer (COC), cycloalkene copolymer (COP), and thermoplastic polyester (PET).

In another aspect of the present invention, the shutter glasses further comprises an incident side and an emitting side. The normally-black LCD panel is located on the incident side and the normally-white LCD panel is located on the emitting side.

In still another aspect of the present invention, the shutter glasses further comprises an incident side and an emitting side. The normally-black LCD panel is located on the emitting side and the normally-white LCD panel is located on the incident side.

In yet another aspect of the present invention, the shutter glasses further comprises a driving circuit, configured to generate a driving signal to drive the LCD panel.

In contrast to the related art, the present invention installs stacked normally-white LCD panel and normally-black LCD panel in the shutter glasses. Furthermore, the present invention installs an optical compensation film between the first polarizer and the liquid crystal layer of the normally-black LCD panel or/and between the second polarizer and the liquid crystal layer of the normally-black LCD panel. In this way, the present invention is able to compensate for the dispersion when the normally-black LCD panel is in a dark mode such that the 3D crosstalk is reduced. Moreover, the present invention installed the normally-white LCD panel and the normally-black LCD panel having different thicknesses. This makes the response time of the shutter glasses respectively equal to the voltage rising time of the normally-white LCD panel and the normally-black LCD panel. Therefore, the response time of the shutter glasses is shorten such that a purpose of lower the power consumption can be achieved.

DETAILED DESCRIPTION OF THE PREFERRED EMBODIMENT

Figure 1:
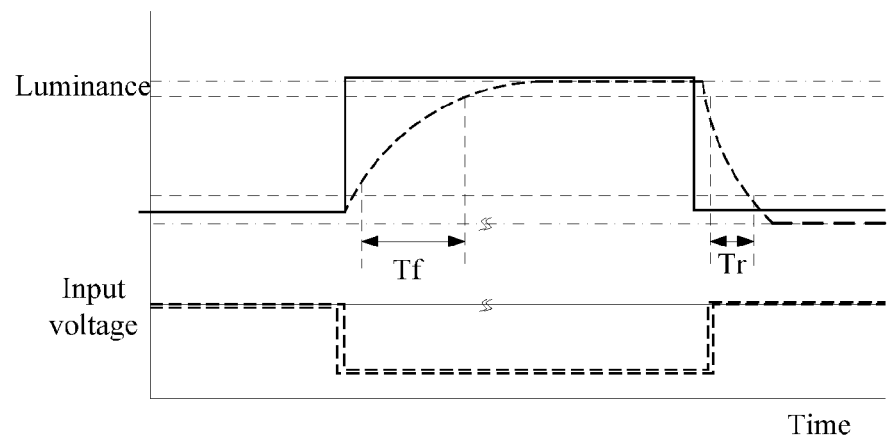
FIG. 1 is a diagram showing a response waveform of shutter glasses according to the related art.
Figure 2:
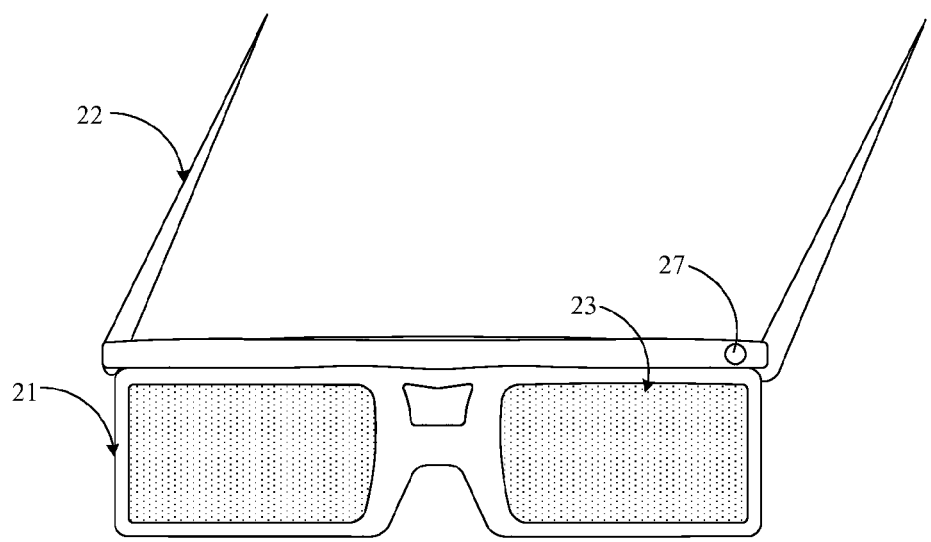
FIG. 2 is a diagram showing a structure of shutter glasses according to a first embodiment of the present invention.

Please refer to FIG. 2, which is a diagram showing a structure of shutter glasses according to a first embodiment of the present invention. As shown in FIG. 2, the shutter glasses 20 comprise a frame 21, legs 22, LCD panels 23, and a driving circuit 27. The legs 22 are used to support the frame 21. The frame 21 is used to support the LCD panels 23, which are utilized as lens. The driving circuit 27 is installed on the legs and is used to generate a driving signal to drive the LCD panels 23. Furthermore, the driving signal is optimized as a square wave signal.

Figure 3:
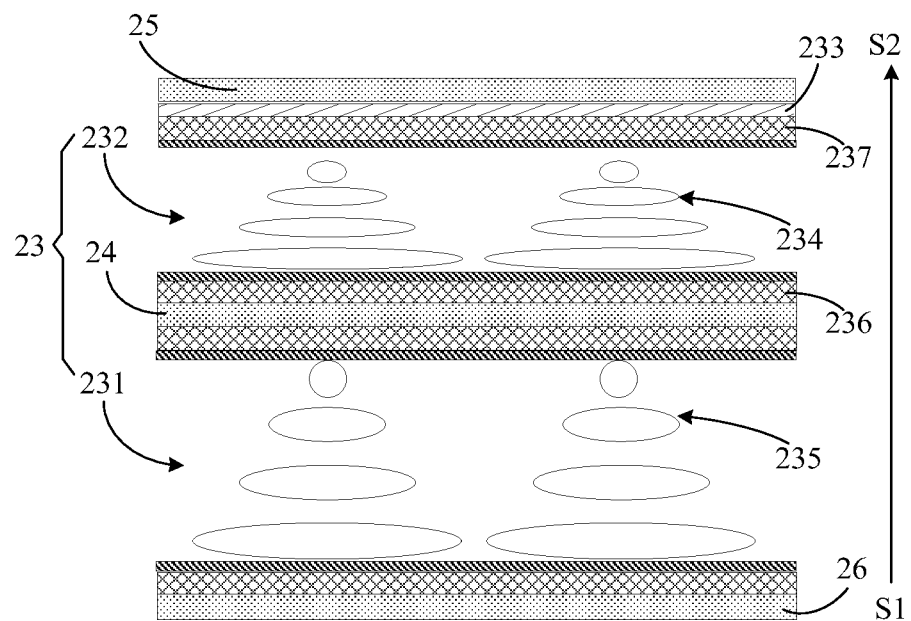
FIG. 3 is a diagram showing a part of the shutter glasses shown in FIG. 2.

Please refer to FIG. 3, which is a diagram showing a part of the shutter glasses 20 shown in FIG. 2. In FIG. 3, the LCD panel 23 comprises a normally-white LCD panel 231 and a normally-black LCD panel 232. The thickness of the normally-black LCD panel 232 is not the same as the thickness of the normally-white LCD panel 231.

The shutter glasses 20 further comprises a first polarizer 24, a second polarizer 25, and a third polarizer 26. The normally-white LCD panel 231 comprises a liquid crystal layer 235. The normally-black LCD panel 232 comprises a liquid crystal layer 234. The first polarizer 24 is installed between the normally-white LCD panel 231 and the normally-black LCD panel 232. The liquid crystal layer 234 of the normally-black LCD panel 232 is installed between the first polarizer 24 and the second polarizer 25. The normally-white LCD panel 231 is between the third polarizer 26 and the first polarizer 24. An optical compensation film is installed between the second polarizer 25 and the liquid crystal layer 234 of the normally-black LCD panel 232 in order to compensate for the dispersion when the liquid crystal layer 234 of the normally-black LCD panel 232 is in a dark mode.

Specifically, the normally-black LCD panel 232 further comprises a first substrate 236 and a second substrate 237. The first substrate 236 is close to the first polarizer 24. The second substrate 237 is close to the second polarizer 25. The liquid crystal layer 234 is between the first substrate 236 and the second substrate 237. In this embodiment, the optical compensation film 233 is installed between the second polarizer 25 and the second substrate 237.

In this embodiment, the thickness of the optical compensation film 233 is determined according to the variance trend of the dispersion of the liquid crystal layer 234 of the normally-black LCD panel 232. Specifically, if the variance trend of the dispersion of the liquid crystal layer 234 is larger, the variance trend of the dispersion of the optical compensation film 233 is larger. Therefore, the thickness is determined to be thicker. However, once the material for manufacturing the liquid crystal layer 234 is determined, the variance trend of the dispersion of the liquid crystal layer 234 is determined. Therefore, the variance trend of the dispersion can firstly be evaluated according to the material of the liquid crystal layer 234 of the normally-black LCD panel 232. And then, the thickness of the optical compensation film 233 can then be determined correspondingly according to the variance trend of dispersion of the liquid crystal layer 234 such that the optical compensation film 233 can be designed to compensate for the dispersion phenomenon.

In this embodiment, the optical compensation film 233 is a compensation film having multiple optic axes. It means that the optical compensation film 233 has multiple refraction rates along different optic axes. The main material for manufacturing the optical compensation film 233 includes one or the combination of acetate fiber (TAC), cycloalkene polymer (COC), cycloalkene copolymer (COP), and thermoplastic polyester (PET).

After the optical compensation film 233 is installed, the thickness of the normally-black LCD panel 232 is then adjusted. The adjustment procedure is: providing a composite light source to the normally-black LCD panel 232, which is in the normal phase, and then adjusting the thickness of the normally-black LCD panel 232 until the phase difference ($\Delta nd$) of the lights having different wavelengths can maintain a fixed value after the lights having different wavelengths pass through the normally-black LCD panel 232 and the optical compensation film.

Figure 4:
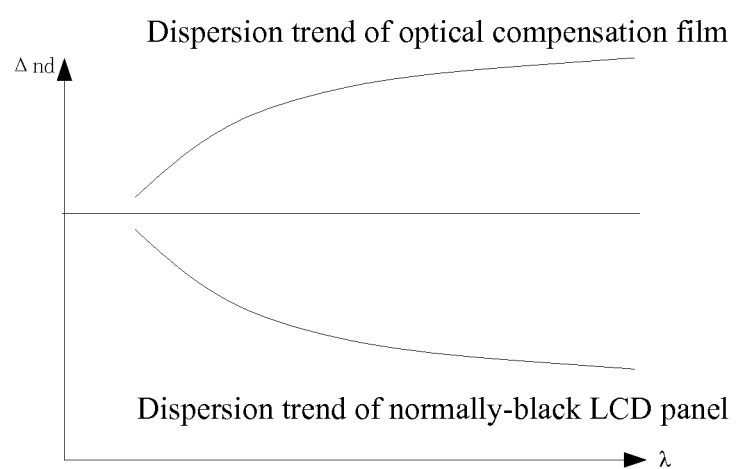
FIG. 4 is a diagram showing a relationship between the waveform and a dispersion trend.

Please refer to FIG. 4, which is a diagram showing a relationship between the waveform and a dispersion trend. Because the optical compensation film 233 compensates for the dispersion due that the lights having different wavelengths pass through the liquid crystal layer 234, this makes the phase difference ($\Delta nd$) maintain a fixed value, and the phases of the lights having different wavelengths $\lambda$ are rotated by 90 degrees after the lights pass through the normally-black LCD panel 232. At this time, the transmittance of the normally-black LCD panel 232 is the lowest. As is known, the normal phase of the normally-black LCD panel 232 is the dark mode, and the normal phase of the normally-white LCD panel 231 is the bright mode. Therefore, the lowest transmittance of the normally-black LCD panel 232 can reduce 3D crosstalk of the shutter glasses 20.

Please note, after the optical compensation film 233 is installed inside the shutter glasses 20, in order to guarantee the lowest transmittance of the normally-black LCD panel 232, the thickness of the normally-black LCD panel 232 is adjusted to be different from the thickness of the normally-white LCD panel 231. In addition, the present invention does not limit the thickness of the normally-black LCD panel 232. The thickness of the normally-black LCD panel 232 can be adjusted as long as it can guarantee that the normally-black LCD panel 232 has the lowest transmittance.

In this embodiment, the shutter glasses 20 further comprises an incident side S1 and an emitting side S2. Please note, the normally-white LCD panel 231 is installed on the incident side S1, and the normally-black LCD panel 232 is installed on the emitting side S2.

In another embodiment, the normally-black LCD panel 232 is installed on the incident side S1, and the normally-white LCD panel 231 is installed on the emitting side S2.

Figure 5:
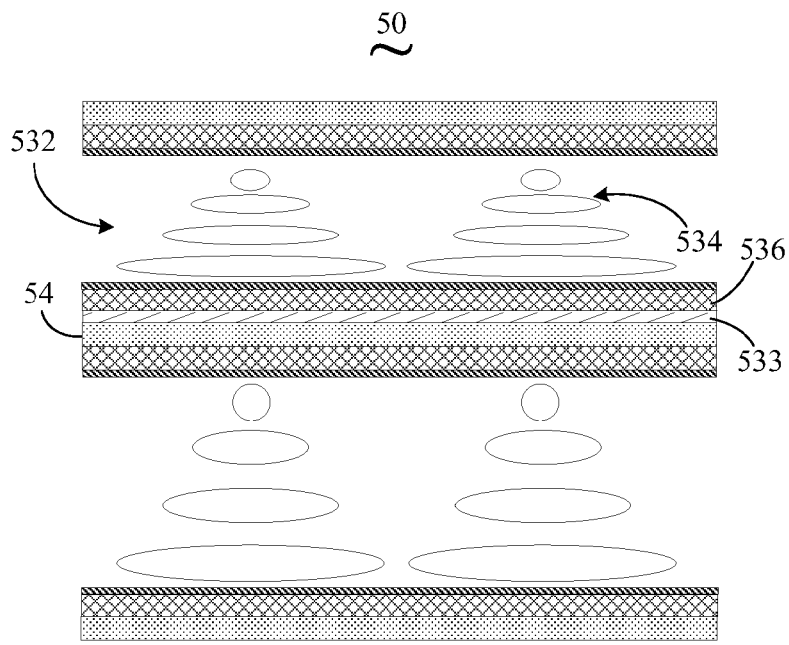
FIG. 5 is a diagram showing a part of the shutter glasses according to a second embodiment of the present invention.

Please refer to FIG. 5, which is a diagram showing a part of the shutter glasses according to a second embodiment of the present invention. The difference between the shutter glasses 50 and the shutter glasses 20 of the first embodiment is: the optical compensation film 533 of the shutter glasses 50 is installed between the first polarizer 54 and the first substrate 536.

Similarly, the optical compensation film 533 can also compensate for the dispersion when the liquid crystal layer 534 of the normally-black LCD pane 532 is the dark mode.

Figure 6:
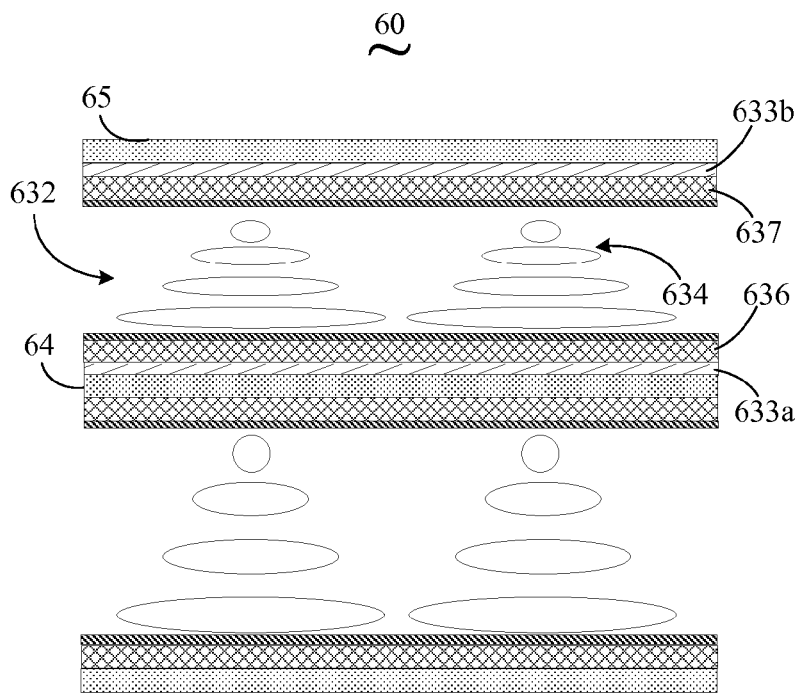
FIG. 6 is a diagram showing a part of the shutter glasses according to a third embodiment of the present invention.

Please refer to FIG. 6, which is a diagram showing a part of the shutter glasses according to a third embodiment of the present invention. The difference between the shutter glasses 60 and the shutter glasses 20 of the first embodiment is: the shutter glasses 60 comprise a first optical compensation film 633a and a second optical compensation film 633b. The first optical compensation film 633a is installed between the first polarizer 64 and the first substrate 636, and the second optical compensation film 633b is installed between the second polarizer 65 and the second substrate 637.

Please note, in the condition that the material and producing method of the optical compensation film is similar and the normally-black LCD panel has similar dispersion trend, the first optical compensation film 633a and the second optical compensation film 633b has a thinner thickness than the optical compensation film 233 of the first embodiment.

Similarly, the first optical compensation film 633a and the second optical compensation film 633b can also compensate for the dispersion when the liquid crystal layer 634 of the normally-black LCD pane 632 is the dark mode.

Figure 7:
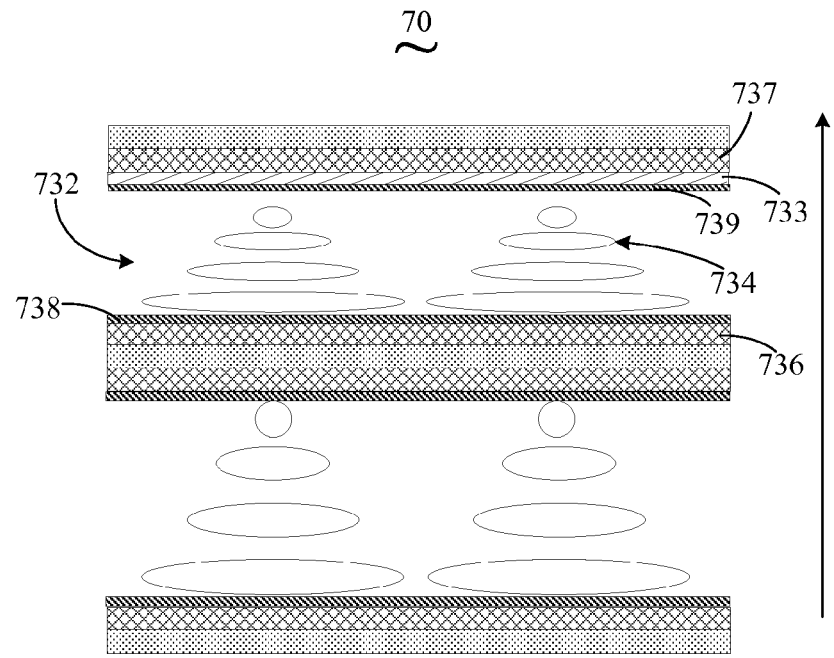
FIG. 7 is a diagram showing a part of the shutter glasses according to a fourth embodiment of the present invention.

Please refer to FIG. 7, which is a diagram showing a part of the shutter glasses according to a fourth embodiment of the present invention. The difference between the shutter glasses 70 and the shutter glasses 20 of the first embodiment is: the optical compensation film 733 of the shutter glasses 70 is installed between the second substrate 737 and the liquid crystal layer 734 of the normally-black LCD panel 732. Specifically, the normally-black LCD panel 732 further comprises a first transparent electrode 738 and a second transparent electrode 739. The first transparent electrode 738 is installed between the first substrate 736 and the liquid crystal layer 734. The first transparent electrode 739 is installed between the second substrate 737 and the liquid crystal layer 739.

In another embodiment, the optical compensation film 733 can be installed between the first substrate 736 and the first transparent electrode 738. Or, there are two optical compensation films 733, which are respectively installed between the first substrate 736 and the first transparent electrode 738 and between the second substrate 737 and the second transparent electrode 739.

Figure 8:
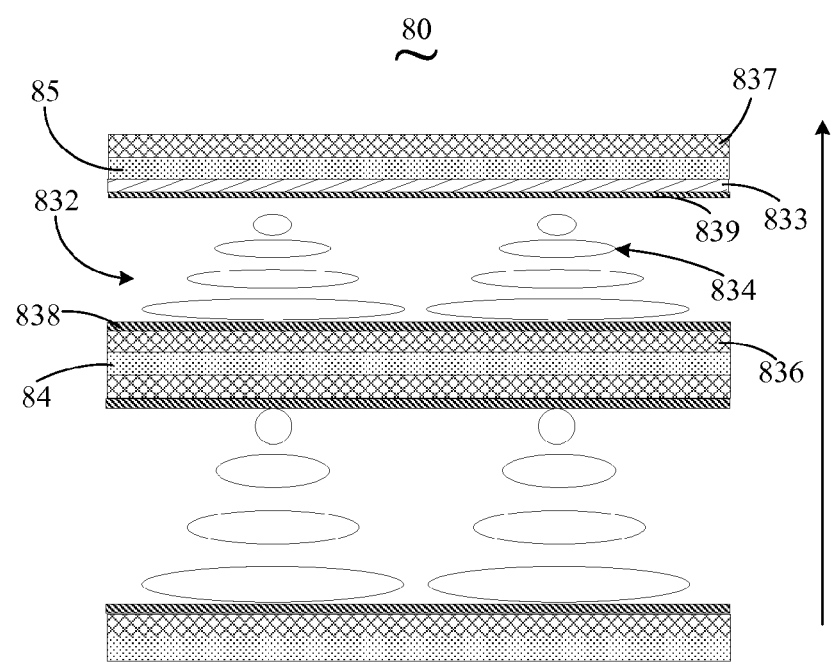
FIG. 8 is a diagram showing a part of the shutter glasses according to a fifth embodiment of the present invention.

Please refer to FIG. 8, which is a diagram showing a part of the shutter glasses according to a fifth embodiment of the present invention. The difference between the shutter glasses 80 and the shutter glasses 70 of the fourth embodiment is: the optical compensation film 833 and the second polarizer 85 are both installed between the second substrate 837 and the second transparent electrode 839, where the optical compensation film 833 is close to the second transparent electrode 839 and the second polarizer 85 is close to the second substrate 837.

In another embodiment, the optical compensation film 833 and the first polarizer 84 are both installed between the first substrate 836 and the first transparent electrode 838, where the optical compensation film 833 is close to the first transparent electrode 838 and the first polarizer 84 is close to the first substrate 836. Or, there are two optical compensation films 833. One compensation films 833 and the first polarizer 84 are installed between the first substrate 836 and the first transparent 838. The other compensation film 833 and the second polarizer 85 are installed between the second substrate 837 and the second transparent electrode 839.

Please note, the operation principle of the shutter glasses 20 of the first embodiment shown in FIG. 2 and FIG. 3 will be illustrated in the following disclosure.

Figure 9:
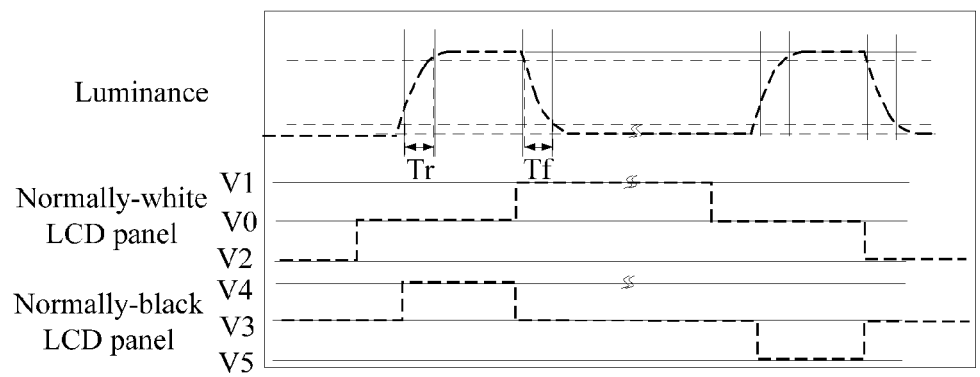
FIG. 9 is a diagram showing a response waveform of the shutter glasses according to the present invention.

Please refer to FIG. 9 in conjunction with FIG. 3. FIG. 9 is a diagram showing a response waveform of the shutter glasses according to the present invention. As shown in FIG. 9, the voltage signals V0, V1, and V2 are used for driving the normally-white LCD panel 231 and the voltage signals V3, V4, and V5 are used for driving the normally-black LCD panel 232. These voltages signals V0-V5 are provided by the driving circuit 27 shown in FIG. 2.

In this embodiment, the optical axis of the second polarizer 25 is parallel to the optical axis of the first polarizer 24, and the optical axis of the third polarizer 26 is perpendicular to the optical axis of the first polarizer 24. The LCD panel 23 is a TN-type LCD panel. When there is no voltage applied to the normally-white LCD panel 231 (the voltage V0 is 0), the polarization of light passing through the second liquid crystal layer 235 is rotated by 90 degrees relative to that of the light passing through the third polarizer 26, i.e. the polarization direction of the light passing through the second liquid crystal layer 235 is parallel to the optical axis of the first polarizer 24. Therefore, the light can pass through the normally-white LCD panel 231 and the normally-white LCD panel 231 is in the bright mode. When the voltage changes from V0 to V1 or V2, the liquid crystals of the normally-white LCD panel 231 are arranged perpendicularly. At this time, the second liquid crystal layer 235 does not rotate. Therefore, the normally-white LCD panel is in the dark mode.

Correspondingly, when there is no voltage inputted to the normally-black LCD panel 232 (the voltage V3 is 0), the polarization of light passing through the first liquid crystal layer 234 is rotated by 90 degrees relative to that of the light passing through the first polarizer 24, i.e. the polarization direction of the light passing through the first liquid crystal layer 234 is perpendicular to the optical axis of the first polarizer 25. Therefore, the light cannot pass through the normally-black LCD panel 232 and the normally-black LCD panel 232 is in the dark mode. When the voltage changes from V3 to V4 or V5, the liquid crystals of the normally-black LCD panel 232 are arranged perpendicularly. At this time, the first liquid crystal layer 234 does not rotate. Therefore, the normally-white LCD panel is in the bright mode.

Please note, when there is no voltage inputted to the normally-black LCD) panel 232, the optical compensation film 233 compensates for the dispersion of the normally-black LCD panel 232 such that the transmittance of the normally-black LCD panel 232 becomes the lowest and the 3D crosstalk is reduced.

The bright/dark condition of the shutter glasses 20 is determined by both the voltage of the normally-white LCD panel 231 and the voltage of the normally-black LCD panel 232. A period of the bright/dark condition of the shutter glasses 20 will be illustrated in the following disclosure.

Basic condition: The voltage of the normally-white LCD panel 231 is the voltage V0, and the voltage of the normally-black LCD panel 232 is the voltage V3. At this time, the lights can pass through the normally-white LCD panel 231 but cannot pass thorough the normally-black LCD panel 232. Therefore, at this time, the shutter glasses are in the dark mode.

From the dark mode to bright mode: The voltage of the normally-white LCD panel 231 is still the voltage V0. The normally-white LCD panel 231 is in the bright mode. The voltage of the normally-black LCD panel 232 rises from the voltage V3 to the voltage V4. Therefore, the light can pass through the normally-black LCD panel 232, and the normally-black LCD panel 232 is in the bright mode. Therefore, the shutter glasses are in the bright mode. Furthermore, at this time, the response time Tr of the shutter glasses is the time duration when the voltage of the normally-black LCD panel 232 rises from the voltage V3 to V4.

From the bright mode to dark mode: The voltage of the normally-white LCD panel 231 rises from the voltage V0 to the voltage V1. At the same time, the voltage of the normally-black falls from the voltage V4 to the voltage V3. Therefore, the light cannot pass through the normally-white LCD panel 231 and the normally-black LCD panel 232. The shutter glasses changes from the bright mode to the dark mode. The response time Tf of the shutter glasses is the time duration when the voltage of the normally-white LCD panel 231 rises from the voltage V0 to the voltage V1.

It can be understood that the falling time of the voltage of the normally-black LCD panel 232 is longer than the rising time of the voltage of the normally-white LCD panel 231. But, after the rising time of the voltage of the normally-white LCD panel 231, the light cannot pass through the normally-white LCD panel 231. Therefore, at this time, even the voltage of the normally-black LCD panel 232 is still falling, the normally-white LCD panel 231 is able to block the light and no light pass through the normally-black LCD) panel 232.

Because the rising time of the voltage of the normally-white LCD panel 231 is the same as that of the normally-black LCD panel 232, the response time of the shutter glasses 20 is the same. That is, Tr=Tf. Furthermore, an entire period of the response time of the shutter glasses 20 is the sum of the rising time of the normally-white LCD panel 231 and the rising time of the normally-black LCD panel 232. In the related art, an entire period of the response time of the shutter glasses is the sum of the rising time and the falling time of the voltage of the LCD panel. In contrast to the related art, the present invention shutter glasses 20 needs less time. Therefore, the present invention can reduce the power consumption and reduce the cost.

Please note, the operation principle of the shutter glasses of the second, third, fourth, and fifth embodiments are the same as that of the first embodiment, and further illustration is omitted here.

Figure 10:
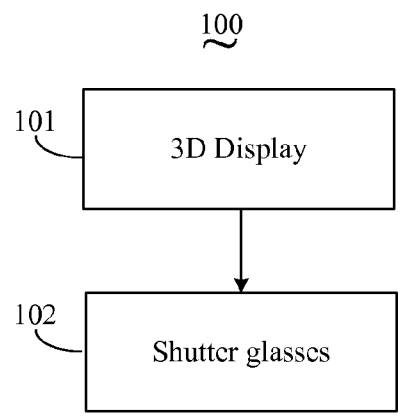
FIG. 10 is a diagram showing a 3D display system according to the present invention.

Please refer to FIG. 10, which is a diagram showing a 3D display system according to the present invention. The 3D display system 100 comprises a 3D display 101 and shutter glasses 102. The 3D display 101 provides a display image to the shutter glasses 102. The shutter glasses 102 make the display image have the 3D effect. Please note, the shutter glasses 102 is the shutter glasses of the first to fifth embodiments, and further illustration is omitted here.

To sum up, the present invention installs stacked the normally-white LCD panel and the normally-black LCD panel having different thickness in the shutter glasses. Furthermore, an optical film is installed between the first polarizer and the liquid crystal layer of the normally-black LCD panel and/or the second polarizer and the liquid crystal layer of the normally-black LCD panel to compensate for the dispersion when the normally-black LCD panel is in the dark mode. In addition, after installing the optical compensation film, the present invention adjusts the thickness of the normally-black LCD panel such that the transmittance of the normally-black LCD panel can be the lowest in the dark mode and the 3D crosstalk is reduced.

Moreover, the present invention installs stacked the normally-white LCD panel and the normally-black LCD panel such that the response time of the shutter glasses is respectively equal to rising time of the voltage of the normally-white LCD panel and the rising time of the voltage of the normally-black LCD panel. Therefore, the response time of the shutter glasses is reduced and the power consumption is reduced.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A shutter glasses, comprising:
a frame;
a liquid crystal display panel, installed inside the frame, the liquid crystal panel comprising stacked a normally-white LCD panel and a normally-black LCD panel, wherein a thickness of the normally-white LCD panel is not the same as a thickness of the normally-black LCD panel;
a first polarizer, installed between the normally-white LCD panel and the normally-black LCD panel; and
a second polarizer;
wherein the normally-black LCD panel comprises a first substrate and a second substrate, a liquid crystal layer of the normally-black LCD panel is sandwiched between the first substrate and the second substrate, the first substrate is close to the first polarizer, the second substrate is close to the second polarizer, and the optical compensation film is installed between the first substrate and the first polarizer and/or between the second substrate and the second polarizer in order to compensate for a dispersion occurred when the liquid crystal layer of the normally-black LCD panel is in a dark mode,
wherein a thickness of the optical compensation film is determined according to a variance trend of the dispersion of the liquid crystal layer of the normally-black LCD panel, and the thickness is determined to be thicker when the variance trend is larger.

2. The shutter glasses of claim 1, wherein the optical compensation film is made by a material selected from a group consisting of acetate fiber (TAC), cycloalkene polymer (COC), cycloalkene copolymer (COP), and thermoplastic polyester (PET).

3. A shutter glasses, comprising:
a frame;
a liquid crystal display panel, installed inside the frame, the liquid crystal panel comprising stacked a normally-white LCD panel and a normally-black LCD panel, wherein a thickness of the normally-white LCD panel is not the same as a thickness of the normally-black LCD panel;
a first polarizer, installed between the normally-white LCD panel and the normally-black LCD panel; and
a second polarizer;
wherein a liquid crystal layer of the normally-black LCD panel is installed between the first polarizer and the second polarizer, and an optical compensation film is installed between the first polarizer and the liquid crystal layer of the normally-black LCD panel and/or between the second polarizer and the liquid crystal layer of the normally-black LCD panel in order to compensate for a dispersion occurred when the liquid crystal layer of the normally-black LCD panel is in a dark mode.

4. The shutter glasses of claim 3, wherein a thickness of the optical compensation film is determined according to a variance trend of the dispersion of the liquid crystal layer of the normally-black LCD panel, and the thickness is determined to be thicker when the variance trend is larger.

5. The shutter glasses of claim 3, wherein the normally-black LCD panel comprises a first substrate and a second substrate, the liquid crystal layer is sandwiched between the first substrate and the second substrate, the first substrate is close to the first polarizer, the second substrate is close to the second polarizer, and the optical compensation film is installed between the first substrate and the first polarizer and/or between the second substrate and the second polarizer.

6. The shutter glasses of claim 3, wherein the normally-black LCD panel comprises a first substrate and a second substrate, the liquid crystal layer is sandwiched between the first substrate and the second substrate, the first substrate is close to the first polarizer, the second substrate is close to the second polarizer, and the optical compensation film is installed between the first substrate and the liquid crystal layer and/or between the second substrate and the liquid crystal layer.

7. The shutter glasses of claim 3 further comprising a third polarizer, wherein the normally-white LCD panel is between the first polarizer and the third polarizer, an optical axis of the second polarizer is parallel to an optical axis of the first polarizer, and an optical axis of the third polarizer is perpendicular to the optical axis of the first polarizer.

8. The shutter glasses of claim 3, wherein the optical compensation film is made by a material selected from a group consisting of acetate fiber (TAC), cycloalkene polymer (COC), cycloalkene copolymer (COP), and thermoplastic polyester (PET).

9. The shutter glasses of claim 3 further comprising an incident side and an emitting side, wherein the normally-black LCD panel is located on the incident side and the normally-white LCD panel is located on the emitting side.

10. The shutter glasses of claim 3 further comprising an incident side and an emitting side, wherein the normally-black LCD panel is located on the emitting side and the normally-white LCD panel is located on the incident side.

11. The shutter glasses of claim 3 further comprising a driving circuit, configured to generate a driving signal to drive the LCD panel.

12. A 3D display system comprising a shutter glasses, the shutter glasses comprising:
  a frame;
  a liquid crystal display panel, installed inside the frame, the liquid crystal panel comprising stacked a normally-white LCD panel and a normally-black LCD panel, wherein a thickness of the normally-white LCD panel is not the same as a thickness of the normally-black LCD panel;
  a first polarizer, installed between the normally-white LCD panel and the normally-black LCD panel; and
  a second polarizer;
  wherein a liquid crystal layer of the normally-black LCD panel is installed between the first polarizer and the second polarizer, and an optical compensation film is installed between the first polarizer and the liquid crystal layer of the normally-black LCD panel and/or between the second polarizer and the liquid crystal layer of the normally-black LCD panel in order to compensate for a dispersion occurred when the liquid crystal layer of the normally-black LCD panel is in a dark mode.

13. The 3D display system of claim 12, wherein a thickness of the optical compensation film is determined according to a variance trend of the dispersion of the liquid crystal layer of the normally-black LCD panel, and the thickness is determined to be thicker when the variance trend is larger.

14. The 3D display system of claim 12, wherein the normally-black LCD panel comprises a first substrate and a second substrate, the liquid crystal layer is sandwiched between the first substrate and the second substrate, the first substrate is close to the first polarizer, the second substrate is close to the second polarizer, and the optical compensation film is installed between the first substrate and the first polarizer and/or between the second substrate and the second polarizer.

15. The 3D display system of claim 12, wherein the normally-black LCD panel comprises a first substrate and a second substrate, the liquid crystal layer is sandwiched between the first substrate and the second substrate, the first substrate is close to the first polarizer, the second substrate is close to the second polarizer, and the optical compensation film is installed between the first substrate and the liquid crystal layer and/or between the second substrate and the liquid crystal layer.

16. The 3D display system of claim 12, wherein the shutter glasses further comprises a third polarizer, wherein the normally-white LCD panel is between the first polarizer and the third polarizer, an optical axis of the second polarizer is parallel to an optical axis of the first polarizer, and an optical axis of the third polarizer is perpendicular to the optical axis of the first polarizer.

17. The 3D display system of claim 12, wherein the optical compensation film is made by a material selected from a group consisting of acetate fiber (TAC), cycloalkene polymer (COC), cycloalkene copolymer (COP), and thermoplastic polyester (PET).

18. The 3D display system of claim 12, wherein the shutter glasses further comprises an incident side and an emitting side, wherein the normally-black LCD panel is located on the incident side and the normally-white LCD panel is located on the emitting side.

19. The 3D display system of claim 12, wherein the shutter glasses further comprises an incident side and an emitting side, wherein the normally-black LCD panel is located on the emitting side and the normally-white LCD panel is located on the incident side.

20. The 3D display system of claim 12, wherein the shutter glasses further comprises a driving circuit, configured to generate a driving signal to drive the LCD panel.

* * * * *